United States Patent Office 2,954,250
Patented Sept. 27, 1960

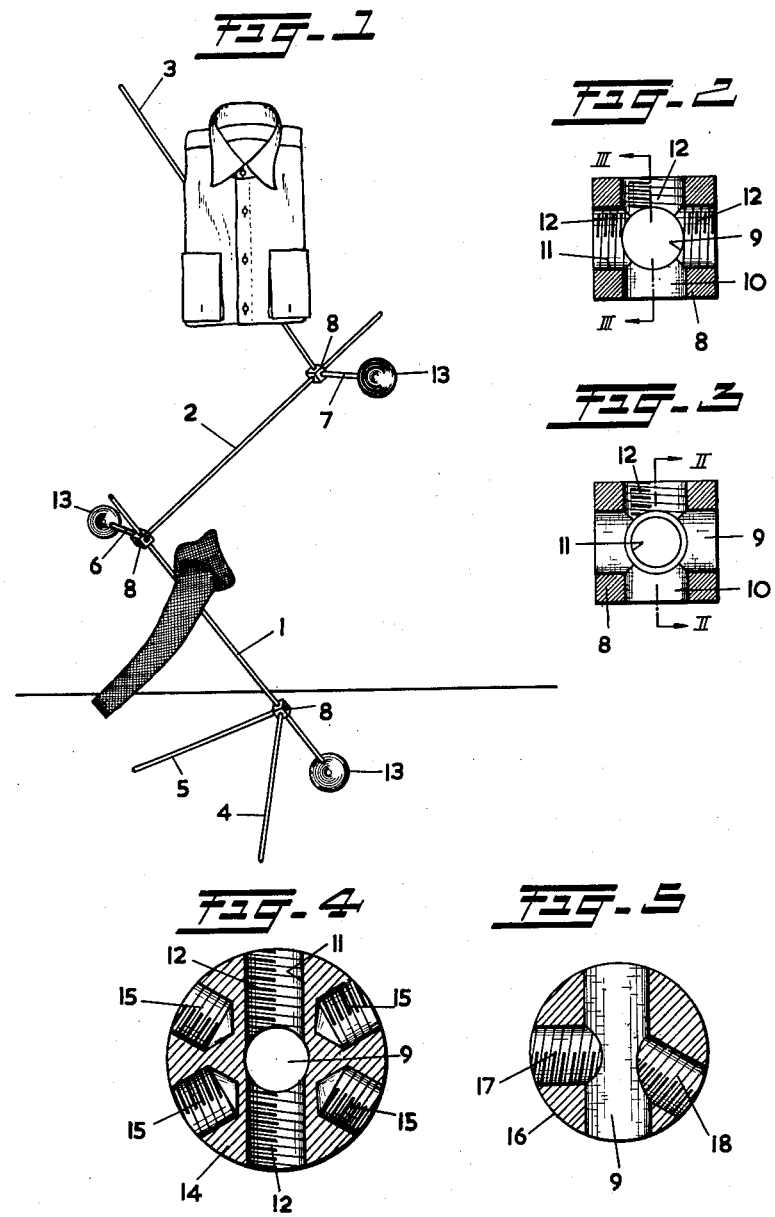

2,954,250

DISPLAY STAND

Howard Wing, Schiedamsedijk 68–70, Rotterdam, Netherlands

Filed Nov. 7, 1957, Ser. No. 695,143

3 Claims. (Cl. 287—54)

This invention relates to display stands which are built up from a plurality of rods.

The conventional display stands of this type no longer come up to the requirements of the present day art of window dressing.

The object of the invention is to provide a display stand which makes it possible to proceed on new lines in dressing windows.

To achieve this end according to the invention the display stand is so constructed that each rod is of the same circular cross-section and has at least one end provided with external screw thread, of at least one element for interconnecting the rods, said element comprising a plurality of bores intersecting one another, one of said bores having at least on one side of the place of intersection an internal screw thread for engagement with the external screw thread of said rods, another of said bores extending throughout said element, being smooth walled and adapted to receive one of the rods in fitting relationship therewith at least one of said screw threaded bores intersecting said smooth walled bore at right angles, the axial length of the external screw threads being greater than the axial length of the internal screw threads.

This renders it possible to arrange the articles to be displayed, which articles may be fitted to a window figure or clip or otherwise and which are secured to the stand in a manner known per se, in spacial relationship.

According to another feature of the invention the connecting element comprises three bores intersecting one another at right angles, one bore being internally screw-threaded on either side of the place of intersection, another bore being internally screw-threaded on one side of said place and being smooth walled on the other side, said smooth walled portion of the bore having the same diameter as the smooth walled third bore.

Owing to this configuration of the connecting element a particularly stylish set up is obtained.

The invention is illustrated with reference to the accompanying drawing in which:

Figure 1 is an embodiment of the display stand according to the invention;

Figure 2 is a sectional view on an enlarged scale of the connecting element on line II—II in Figure 3 and Figure 3 is a sectional view on an enlarged scale of the connecting element on line III—III in Figure 2;

Figures 4 and 5 are cross-sections of two other embodiments of the connecting element according to the invention.

Referring to Figure 1 it will be seen that the display stand is made of rods 1–3 incl. of appreciable length combined with rods 4–7 incl. of comparatively short length. In the places where two or three rods which all have the same circular cross-section, intersect, cube-shaped connecting elements 8 are provided.

Referring now to Figures 2 and 3, these show that the connecting element is provided with three bores 9, 10, 11 which intersect each other at right angles. The bore 9 is cylindrical and smooth and has a diameter that is slightly larger than the diameter of the rods 1–7 incl. The bore 10 is likewise smooth on the one side of the place of intersection of the three bores, but on the other side it is provided with screw thread 12. The bore 11 is provided with screw thread 12 on either side of the place of intersection of the three bores. The internal screw thread of the bores fits the external screw thread on the end of each rod.

Selecting rod 2 as an example it will be shown in what manner a display stand is assembled. The end of said rod 2 is screwed into the connecting element 8 at the place where the rods 1 and 6 intersect and it clamps the rod 1 inserted in the smooth cross bore of the connecting element, so as to secure said rod 1 against movement. This clamping action is possible because the length of the screw thread in the relative portion of the bore in the connecting element is smaller when measured axially than the length of the screw thread provided on the end of the rod.

Since two threaded bores in the connecting element are unoccupied it is possible to screw the short rod 6 into said element.

The display stand may be provided with ornamental balls 13 which are secured to the rods in a manner known per se. The ball 13 at the lower end of the rod 1 serves as a supporting ball.

The connecting element 14 according to Figure 4 is provided with a cylindrical, smooth bore 9, which is intersected at right angles by one bore 11, provided with screw thread 12 on both sides. Said element shows also four blind, threaded bores 15, enclosing angles of 60° with each other and the bore 11, the axes of said bores defining a plane at right angles to the axis of bore 9.

The connecting element 16 according to Figure 5 also shows a cylindrical, smooth bore 9. One bore 17, provided with screw thread intersects the bore 9 at right angles, another threaded bore 18 intersects the bore 9 at an angle of 60°. The axes of said three bores define one plane.

I claim:

1. A display stand device comprising, in combination, a plurality of rods each having the same circular cross section and having at least one end provided with an external screw thread, and at least one connecting element for interconnecting said rods, said element being formed with three bores intersecting each other at right angles, one of said bores being internally threaded throughout its entire length, a second of said bores being internally threaded along half its length with the other half of said second bore having a smooth surface, and the third bore being free from internal threads and having a substantially smooth surface, whereby said rods may be received and gripped by said element by threaded engagement and by frictional locking.

2. A display stand device as defined in claim 1, wherein said connecting element is shaped as a cube.

3. A display stand device as defined in claim 1, wherein the external screw thread on said rods is of longer axial length than half the length of each bore in each element.

References Cited in the file of this patent

UNITED STATES PATENTS

| | | |
|---|---|---|
| 750,803 | Burnside | Feb. 2, 1904 |
| 831,510 | Heimann | Sept. 18, 1907 |
| 2,846,809 | Majewski | Aug. 12, 1958 |

FOREIGN PATENTS

| | | |
|---|---|---|
| 2,593 | Great Britain | Apr. 3, 1913 |
| 141,898 | Great Britain | Apr. 29, 1920 |
| 76,248 | Sweden | Jan. 10, 1933 |
| 956,423 | France | Aug. 1, 1949 |